United States Patent
Kawanishi et al.

(10) Patent No.: US 10,634,782 B2
(45) Date of Patent: Apr. 28, 2020

(54) EXTRAVISUAL OBSTACLE DETECTING SYSTEM

(71) Applicants: WASEDA UNIVERSITY, Shinjuku-ku, Tokyo (JP); OPTOQUEST CO., LTD, Ageo, Saitama (JP)

(72) Inventors: Tetsuya Kawanishi, Tokyo (JP); Masaru Fukumitsu, Ageo (JP)

(73) Assignees: Waseda University, Tokyo (JP); Optoquest Co., Ltd, Saitama (JP)

( * ) Notice: Subject to any disclaimer, the term of this patent is extended or adjusted under 35 U.S.C. 154(b) by 119 days.

(21) Appl. No.: 15/690,202

(22) Filed: Aug. 29, 2017

(65) Prior Publication Data

US 2018/0059240 A1    Mar. 1, 2018

(30) Foreign Application Priority Data

Aug. 31, 2016 (JP) ................ 2016-170289

(51) Int. Cl.

| | |
|---|---|
| *G01S 13/93* | (2020.01) |
| *G01S 13/86* | (2006.01) |
| *G08G 1/16* | (2006.01) |
| *B60W 30/095* | (2012.01) |
| *G01S 13/931* | (2020.01) |
| *B60W 50/14* | (2020.01) |
| *B60Q 9/00* | (2006.01) |
| *G08G 1/0962* | (2006.01) |

(52) U.S. Cl.
CPC .......... *G01S 13/931* (2013.01); *B60Q 9/008* (2013.01); *B60W 30/095* (2013.01); *B60W 50/14* (2013.01); *G01S 13/867* (2013.01); *G08G 1/0962* (2013.01); *G08G 1/166* (2013.01); *G08G 1/167* (2013.01); *G01S 2013/9339* (2013.01); *G01S 2013/9375* (2013.01)

(58) Field of Classification Search
CPC .. G01S 13/931; G01S 13/867; B60W 30/095; G08G 1/166; G08G 1/167
USPC ....................................................... 701/301
See application file for complete search history.

(56) References Cited

U.S. PATENT DOCUMENTS

| | | | | |
|---|---|---|---|---|
| 6,127,965 | A * | 10/2000 | McDade ............... | G01S 13/931 342/104 |
| 2005/0200462 | A1* | 9/2005 | Maekawa ............. | B60Q 1/506 340/435 |
| 2006/0109095 | A1* | 5/2006 | Takata ................. | G01S 13/931 340/436 |

(Continued)

FOREIGN PATENT DOCUMENTS

| | | |
|---|---|---|
| JP | 2011-037318 A | 2/2011 |
| JP | 2011-118483 A | 6/2011 |
| JP | 2015-191583 A | 11/2015 |

*Primary Examiner* — Yazan A Soofi
(74) *Attorney, Agent, or Firm* — Pyprus Pte Ltd (57) ABSTRACT

An extravisual obstacle detecting system includes: a radio wave receiving unit 15 configured to receives a radio wave from a radio wave source 13 attached to an object 11; one or a plurality of external sensors 19 attached to the vehicle 17 and configured to detect an external obstacle; an alarm generating unit 21 configured to generate a predetermined alarm, and, when the radio wave receiving unit 15 receives the radio wave from the object 11, and the external sensors 19 do not detect the object 11, the alarm generating unit 21 generates the first alarm.

10 Claims, 5 Drawing Sheets

(56) References Cited

U.S. PATENT DOCUMENTS

| | | | |
|---|---|---|---|
| 2007/0257783 A1* | 11/2007 | Matsumoto | B60K 6/445 340/425.5 |
| 2013/0002470 A1* | 1/2013 | Kambe | G01S 13/867 342/55 |
| 2014/0218186 A1* | 8/2014 | Kawamoto | G01S 13/04 340/426.1 |
| 2015/0339925 A1* | 11/2015 | Hillenbrand | G08G 1/166 340/901 |
| 2017/0139043 A1* | 5/2017 | Takada | G01S 7/412 |
| 2017/0287332 A1* | 10/2017 | Ranninger Hernandez | G08G 1/005 |
| 2017/0309181 A1* | 10/2017 | Lee | B60Q 5/006 |
| 2018/0106885 A1* | 4/2018 | Blayvas | G01S 13/862 |
| 2018/0130347 A1* | 5/2018 | Ricci | B60R 25/2018 |

\* cited by examiner

EXTRAVISUAL OBSTACLE DETECTING SYSTEM

BACKGROUND

Technical Field

The present invention relates to a system for notifying a driver of a car of the presence of a person existing in a shadow of a building.

Related Art

For example, JP 2015-191583 A describes a cognitive notification device which confirms that another vehicle recognizes an own vehicle.

Next, JP 2011-118483 A describes an in-vehicle device which photographs images of surroundings of an own vehicle, extracts an object coming close to the own vehicle, and calls for driver's attention.

In addition, JP 2011-037318 A describes a driving safety device which detects the presence or absence of an obstacle and permits movement of a car when a driver recognizes an obstacle.

SUMMARY

The invention described in JP 2015-191583 confirms that vehicles recognize each other. Therefore, this invention is not used to recognize people.

The invention described in JP 2011-118483 recognizes the surroundings of a vehicle. For this reason, this invention cannot recognize objects which cannot be visually recognized.

The invention described in JP 2011-037318 A confirms that a driver has recognized an obstacle, and permits the movement of the vehicle. For this reason, this invention cannot recognize objects which cannot be visually recognized.

Conventional obstacle recognition devices for vehicles recognize visually recognizable objects as obstacles. These devices cannot recognize obstacles such as children jumping out which cannot be visually recognized. For example, to recognize all obstacles in the surroundings of an own vehicle by using a GPS, all alarms are set out even for objects which a driver can see. As a result, attention to the most dangerous sudden jump is distracted.

The present invention grasps an object existing in the surroundings of an own vehicle (an object moving in the direction of the own vehicle in particular) separately for the viewing system and the entire object system, and, when there is an object which is not grasped by the viewing system among objects grasped by the entire object system, some alarm is set out in order to draw the driver's attention to it. Naturally, while the object grasped by the viewing system may also be displayed on a monitor and an alarm for the object is set out, the above caution may be performed. That is, when there is an object which is grasped only by the viewing system or by the viewing system and the entire object system, the presence of a visually recognizable object is notified to call for the driver's attention. When there is an object grasped only by the entire object system, the presence of an object with high risk may be notified to the driver.

An object such as a person has an object which emits electromagnetic waves or reflects electromagnetic waves. On the other hand, a system installed in a car has external sensors which reproduce a field of view, and a unit which receives electromagnetic waves. For this reason, this system senses electromagnetic waves from people and grasps a position of the object. In addition, this system receives light from the people, and grasps the position of the object in a case of reproducing the field of view. When an object sensed based on electromagnetic waves includes an object which is not an object in the case of reproducing the field of view, this object is a person existing at a position which the driver cannot visually recognize. For this reason, in such a case, some alarm is notified to the driver.

This invention can effectively prevent disastrous accidents such as jumping out of children, and therefore has high sociability.

DETAILED DESCRIPTION

Hereinafter, a mode for carrying out the present invention will be described with reference to the drawings. The present invention is not limited to the embodiment described below, but includes modifications appropriately made within the scope obvious to those skilled in the art.

Figure 1:
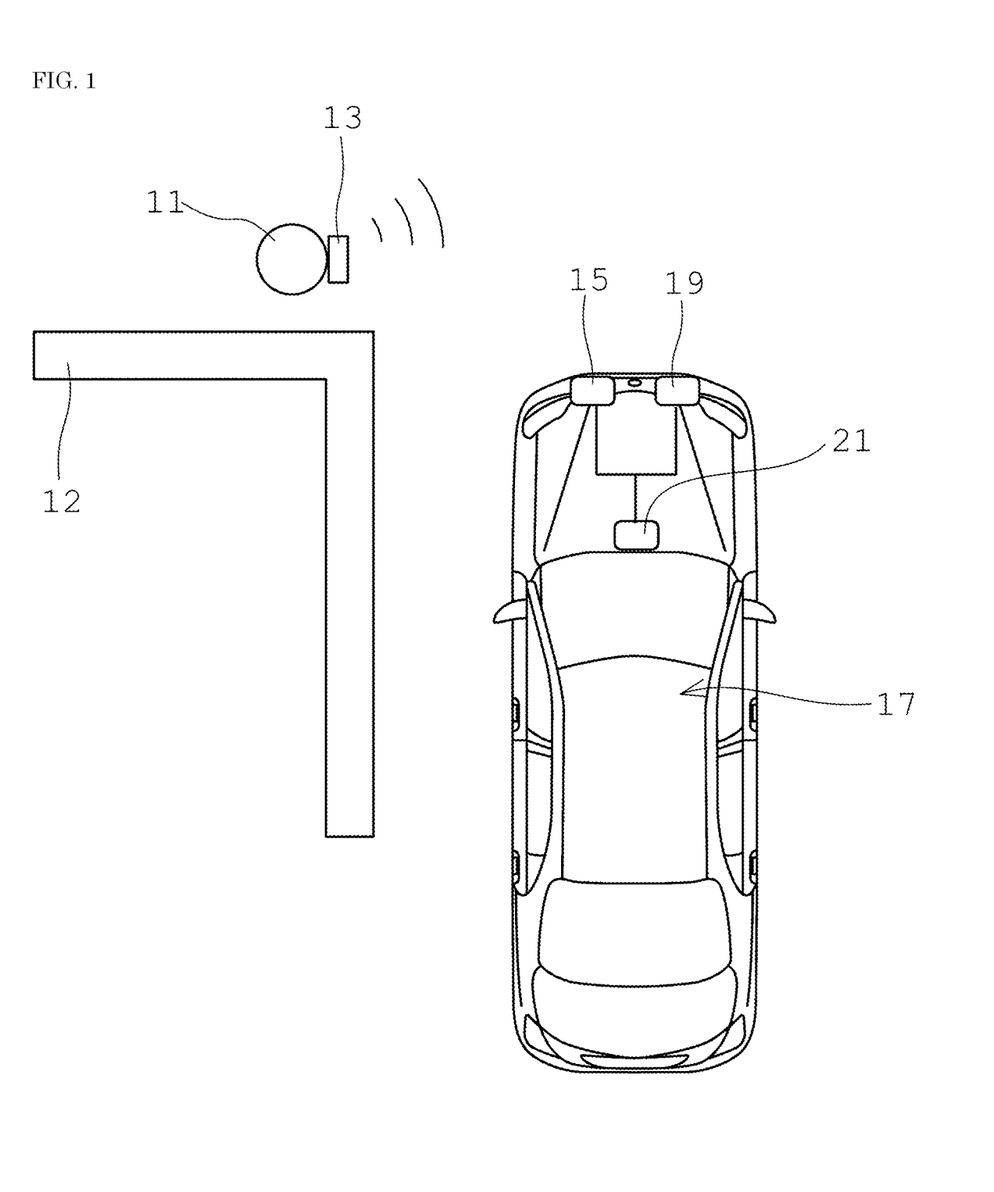
FIG. 1 is a view showing an overview of an extravisual obstacle detecting system according to the present invention.

FIG. 1 is a diagram showing an overview of an extravisual obstacle detecting system according to the present invention. As shown in FIG. 1, this system includes a radio wave receiving unit 15 and receives radio waves from a radio wave source 13 which is attached to an object 11, and one or a plurality of external sensors 19 which is attached to a vehicle 17 and detects an obstacle in an outside world. The system has an alarm generating unit 21 which generates a predetermined alarm. In an example of FIG. 1, the radio wave receiving unit 15 is attached to the vehicle 17. However, the radio wave receiving unit 15 may be attached to a portion other than the vehicle 17, and may be configured to be able to transmit information to a control unit of the vehicle 17 and the alarm generating unit 21.

The extravisual obstacle detecting system is a system which mainly detects obstacles which the driver of the vehicle cannot visually recognize. The extravisual obstacle detecting system may be realized by a mobile terminal or a system installed in the vehicle 17.

Figure 2:
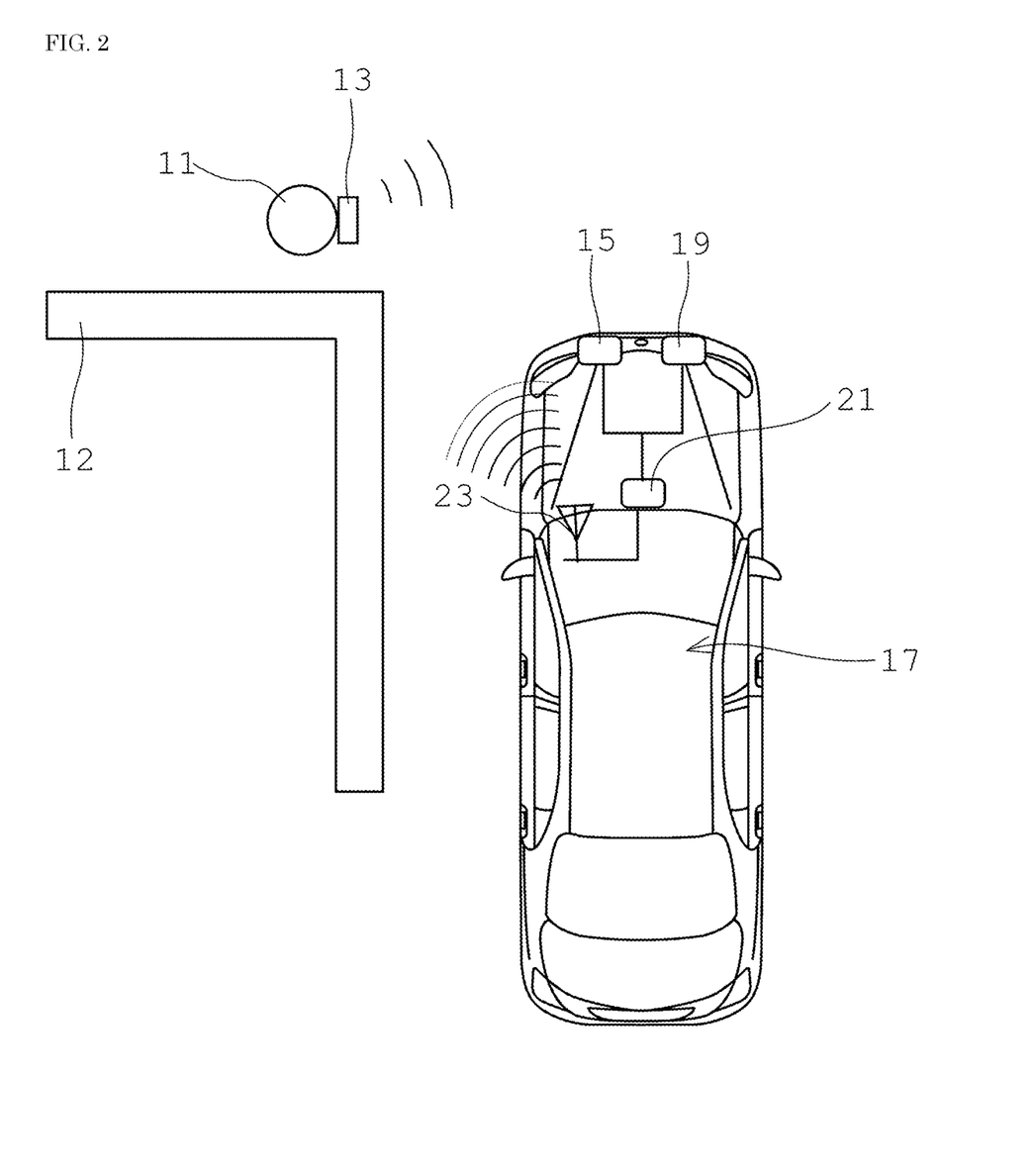
FIG. 2 is a view showing an overview of the extravisual obstacle detecting system according to the present invention.

Examples of the object 11 are cars, strollers, bicycles, people and pets. A specific example of the object is a person, and a preferable object is a child, a disabled person or an old person. The radio wave source 13 is capable of generating or reflecting radio waves. The radio wave source 13 may generate radio waves or may reflect radio waves. FIG. 2 shows an example where a radio wave generating device 23 is attached to the vehicle 17. In this case, the radio wave source 13 may be a radio wave reflecting device which reflects radio waves from the radio wave generating device 23. Further, when receiving a signal from the radio wave source 13, the radio wave generating device 23 may generate a predetermined radio wave. This radio wave source 13 can be implemented by, for example, an application of a mobile terminal. In other words, when a receiving unit of the mobile terminal receives a radio wave from the radio wave source 13, this application may read information from a storage unit of the mobile terminal and perform control to transmit a predetermined signal to an output unit of the mobile terminal. A member which reflects radio waves is a reflector. Specific examples of the radio wave source 13 are a reflection sheet or a reflector attached to a shoe, a school emblem, a patch, a school bag, a mobile terminal or a belt. Examples of the vehicle 17 are automobiles, work vehicles, and bicycles.

Radio waves emitted from the radio wave source 13 or the radio wave generating device 23 are preferably radio waves having a frequency of a microwave band or less. An example of these radio waves is an ISM band, and the radio waves are preferably radio waves of the microwave band or less such as 2.4 GHz, 5 GHz, and 27 MHz. An example of the radio wave receiving unit 15 is an antenna.

Examples of the external sensor 19 are a vehicle-mounted camera, a photographing device, an analyzing device, an obstacle sensor, and a vehicle detecting sensor. For example, the vehicle-mounted camera, the photographing device, and the analyzing device photograph the field of view in front of the vehicle 17. One or a plurality of external sensors 19 preferably uses a second radio wave having a frequency which is five times or more as a frequency of radio waves emitted from the radio wave source 13 or the radio wave generating device 23. Radio waves used for sensing by the external sensors 19 are, for example, light such as infrared light and millimeter waves in a 60 GHz band.

In a preferred example, this system further includes a viewing direction selecting device 25 which is attached to the vehicle 17 and selects the viewing direction of the driver. For example, the viewing direction selecting device 25 may be a wearable device such as JINS MEME. This wearable device analyzes the viewing direction with a gyroscopic sensor or the like of the driver and transmits the viewing direction to the control unit. The control unit determines the viewing direction of the driver based on information from the wearable device. Further, the control unit controls an actuator of the external sensors 19, and controls a direction in which the external sensors perform photographing. In this way, one or a plurality of external sensors 19 can photograph the field of view in the viewing direction of the driver.

Figure 3:
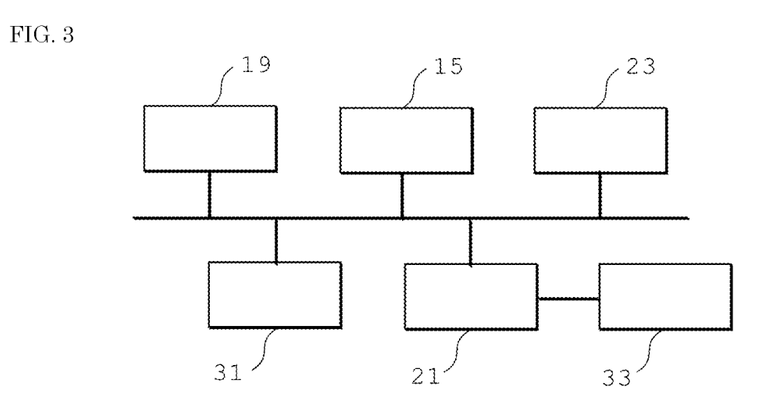
FIG. 3 is a block diagram showing an overview of the extravisual obstacle detecting system according to the present invention.

FIG. 3 is a block diagram of this system. As shown in FIG. 3, this system has, for example, the radio wave receiving unit 15, the external sensors 19, the alarm generating unit 21, the radio wave generating device 23, an analyzing unit 31, and an output unit 33 which are connected to exchange information. The radio wave generating device 23 may be omitted. Also, the above components may be able to exchange information with components other than the above. The analyzing unit 31 includes an input/output unit, an arithmetic operation unit, a control unit, and a storage unit. Then, when information is input from the input/output unit, the information is appropriately read from the storage unit based on the instruction of the control program, the arithmetic operation unit is caused to perform arithmetic processing, and store the information appropriately in the storage unit, and the input/output unit can output a predetermined signal.

Hereinafter, an operation example of the extravisual obstacle detecting system will be described with reference to FIG. 3. One or a plurality of external sensors 19 photographs images in a predetermined direction. In this case, as described above, the field of view in the viewing direction of the driver may be photographed. The images photographed by the external sensors 19 are transmitted to the analyzing unit 31. The analyzing unit 31 may have, for example, the storage unit, the arithmetic operation unit, and the control unit in a car navigation system or an object authentication device (for example, a person authentication device). Then, the analyzing unit 31 matches image data photographed by the external sensors 19 with the data related to an object stored in the storage unit, and detects whether or not a person is included in the images photographed by the external sensors 19. Further, it is also possible to read the data of the storage unit of the car navigation system to determine whether or not the photographed images of the external sensors 19 match with surrounding environment. In this way, the external sensors 19 specify an object (for example, a person). Further, the analyzing unit 31 estimates the position of the object based on the photographed images. In addition, the analyzing unit 31 stores the object and position information of the object. The number of objects is not limited to one. This object is an object which is visually recognized.

On the other hand, the radio wave receiving unit 15 receives radio waves from the object. These radio waves may be generated by the radio wave source 13 of the object 11 or the radio waves generated from the radio wave generating device 23 may be reflected by the radio wave source 13 of the object 11. The analyzing unit 31 analyzes the radio wave received by the radio wave receiving unit 15 and specifies the position of the object which has emitted the received radio waves. For example, when the radio wave is generated from the radio wave generating device 23, it is possible to specify the position of the object by using a frequency change of the received radio wave (a frequency difference between the transmitted radio wave and the received radio wave), a direction of the received radio wave and the difference between a transmission time and a reception time of the radio wave. In addition, the storage unit is caused to store the object and the position information of the object. This object is an object based on radio waves.

The analyzing unit 31 reads from the storage unit the object and the position of the object based on visual recognition, and the object and the position of the object based on the radio wave. In addition, the analyzing unit 31 obtains for each object an object which is an object based on the radio wave and is not an object based on visual recognition. The analyzing unit 31 may also obtain an object which is an object based on visual recognition and is also an object based on radio waves. Further, the analyzing unit 31 may obtain an object which is not an object based on visual recognition and is an object based on radio waves. Also, the presence of an object according to a predetermined rule may be obtained. In addition, the analyzing unit 31 outputs a predetermined control signal to the alarm generating unit 21. The alarm generating unit 21 outputs an alarm signal to the output unit 33. Then, the output unit 33 outputs an alarm.

Figure 4:
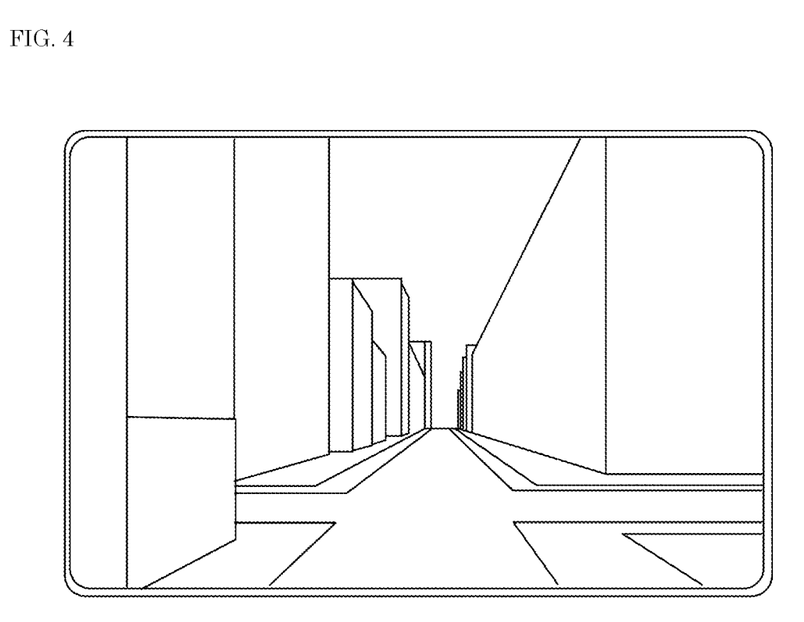
FIG. 4 is a view showing an output example of a car navigation.

Next, an example where a car navigation system is used in combination will be described. FIG. 4 is a view showing an example of a car navigation image.

The radio wave generating device 23 attached to the vehicle 17 emits radio waves. This radio wave may be continuously transmitted, for example. Meanwhile, the radio wave generating device 23 may store a radio wave emission point (and a traveling direction) in the storage unit of the car navigation system, and emit radio waves when determining that the radio wave generating device 23 reaches the radio wave emission point by using a GPS or the like. Further, when the vehicle 17 reaches the radio wave emission point and further travels in a predetermined direction, the radio wave generating device 23 may emit radio waves. The radio wave emission point is, for example, a point toward a point where a certain number or more of accidents have previously occurred or a point toward a position where the field of view is blocked due to a presence of a wall 12. The radio wave emission point may be school routes for kindergartens or elementary schools.

When the predetermined condition is satisfied, the alarm generating unit 21 may emit an alarm sound to the driver, call for attention by vibration or light, or display characters, icons or characters indicating an alarm on a screen in a vehicle. An example of the screen in the vehicle is a car navigation terminal.

Figure 5:
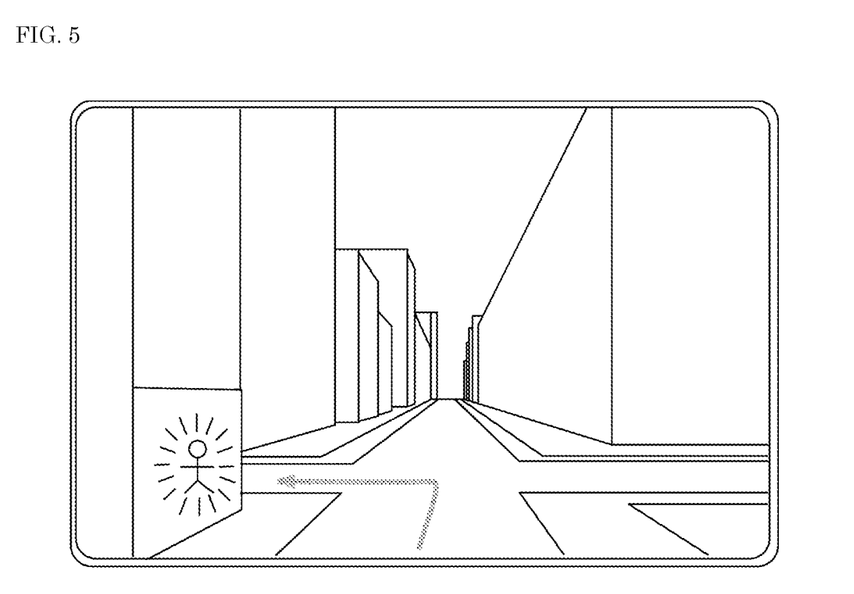
FIG. 5 is a view showing an example where an alarm is displayed by the car navigation.

FIG. 5 is a view showing an example of a car navigation image on which an alarm is displayed. The arrow in FIG. 5 is the traveling direction of the vehicle indicated by the car navigation. Further, in FIG. 5, an icon indicating a person flashes at a position of an object. In this example, the object 11 hides behind the wall 12 and cannot be visually recognized from the vehicle. Thus, the alarm generating unit 21 can indicate in the car navigation image that a subject such as a child exists behind the wall, and call for driver's attention.

An example of generation of an alarm will be described below.

In this example, the alarm generating unit 21 generates a first alarm when the radio wave receiving unit 15 receives a radio wave from the object 11 and the external sensors 19 do not detect the object 11.

In this example, the external sensors 19 send photographing information to the analyzing unit 31. Then, the analyzing unit 31 reproduces the information of a building based on the information from the external sensors. On the other hand, for example, the analyzing unit 31 reads information of the storage unit of the car navigation system from the information related to the position and the traveling direction of the vehicle 17 and examines whether or not the information matches with the information of the building in the car navigation image. Further, based on the photographing information of the external sensors 19, the analyzing unit 31 analyzes the presence of the object to which attention needs to be paid such as a person, a child, an infant, a stroller, an old person, and the position of the object. Methods for analyzing objects and positions of the objects based on images are well known. For example, by storing objects in the storage unit and performing pattern matching with the photographing image, it is possible to grasp the object. Further, by using the traveling direction of the vehicle, the direction of the external sensors, the direction in the photographed image and position information, it is possible to analyze the position of the object. The analyzing unit 31 stores the type of the object analyzed based on the information of the external sensor 19 and the position information of the object in the storage unit.

On the other hand, the radio wave receiving unit 15 receives radio waves emitted from the radio wave generating device 23 and reflected from the radio wave source 13 of the object 11. The radio wave receiving unit 15 may receive radio waves emitted from the radio wave source 13 of the object 11. The radio wave receiving unit 15 may grasp a distance between the object 11 and the vehicle by using a frequency fluctuation of the radio wave emitted by the radio wave generating device 23 and the received radio wave. Further, the position and the distance of the object 11 may be grasped from the direction and strength of the received radio wave.

Next, the analyzing unit 31 compares the object stored in the storage unit and based on the external sensor 19, and the object received by the radio wave receiving unit 15 and based on the radio wave. In addition, when there is an object which is not the object based on the external sensors 19 among objects based on the radio wave received by the radio wave receiving unit 15, the alarm generating unit 21 is instructed to output the first alarm. Then, the alarm generating unit 21 outputs the first alarm to the output unit 33. In this way, when the radio wave receiving unit 15 receives a radio wave from the object 11 and the external sensors 19 do not detect the object 11, it is possible to output an alarm.

The alarm generating unit 21 may generate a second alarm when the radio wave receiving unit 15 receives a radio wave from the object 11 and the external sensors 19 detect the object 11. In this case, an alarm can be generated even when the visually recognizable object 11 exists, and when there is the object 11 which cannot be visually recognized, a different alarm can be generated, so that it is possible to call for the driver's attention.

In this example, when a destination is input to the car navigation system and a route to a destination is requested, and only when the object 11 exists in the traveling direction to the destination, the first alarm or the second alarm may be outputted. In this case, when the object 11 exists at a position other than in the traveling direction, it is possible to prevent the driver from being surprised by the alarm, changing the route to a direction other than the traveling direction, and endangering the object.

Another example of the alarm generating unit 21 is a case where the radio wave receiving unit 15 receives a radio wave from the object 11, the external sensors 19 detect the object 11, and, when it is determined that a distance between the vehicle 17 and the object 11 is a predetermined distance or more, a first alarm is generated. In a case where the driver is nearsighted and does not notice the relatively distant object 11, there is an object which is grasped by the external sensors 19 and is at a predetermined distance or more, it is possible to prevent an accident by issuing an alarm. For example, when the analyzing unit analyzes the magnitude of a time difference (time delay) between emission of a radio wave from the radio wave generating device 23 and reception of the radio wave reflected from the radio wave source 13 of the object 11 at the radio wave receiving unit 15, and the time delay is greater than a threshold, it may be determined that the distance of the object 11 is a predetermined distance or more.

In addition, even when there is an object which is an object based on the radio wave received by the radio wave receiving unit 15 and which is an object based on the external sensors 19, and when a measurement distance (position Information) between these objects differs a predetermined distance or more, the analyzing unit 31 may output a first or second alarm or a third alarm. The alarm can be outputted by storing the threshold in the storage unit, obtaining the difference between positions of objects, and comparing the difference between the threshold and the position of the object.

In another example of the extravisual obstacle detecting system, the alarm generating unit 21 obtains the difference between the frequency of the radio wave received by the radio wave receiving unit 15 and the frequency of the radio wave generated by the radio wave generating device 23, and does not generate the first alarm when the obtained frequency difference is the predetermined value or less. This is because, when this frequency difference is small, the object 11 may exist near the vehicle, and in this case, setting out an alarm is concerned to surprise the driver and lose driver's calm judgment. The storage unit may store the frequency of the radio wave received by the radio wave receiving unit 15 and the frequency of the radio wave generated by the radio wave generating device 23, and the arithmetic operation unit may obtain the frequency difference between the frequencies, read the threshold stored in the storage unit and compare the threshold and the frequency difference.

The present invention can be utilized in an automobile industry.

What is claimed is:

1. An extravisual obstacle detecting system comprising:
    a radio wave receiving unit (15) configured to receive a radio wave from a radio wave source (13) which generates and emits the radio wave and is attached to an object (11);
    one or a plurality of external sensors (19) attached to the vehicle (17) and configured to detect an external obstacle;
    an alarm generating unit (21) which generates a first alarm; and
    an analyzing unit (31),
    wherein the analyzing unit (31) makes the alarm generating unit (21) to generate the first alarm when the radio wave receiving unit (15) receives the radio wave from the radio wave source (13) and the external sensors (19) do not detect the object (11).

2. The extravisual obstacle detecting system according to claim 1, wherein the alarm generating unit (21) is further configured to generate a second alarm when the radio wave receiving unit (15) receives the radio wave from the object (11), and the external sensors (19) detect the object (11).

3. The extravisual obstacle detecting system according to claim 1, wherein the alarm generating unit (21) is configured to generate the first alarm when the radio wave receiving unit (15) receives the radio wave from the object (11) and the external sensors (19) detect the object (11), and it is determined that a distance between the vehicle (17) and the object (11) is a predetermined distance or more.

4. The extravisual obstacle detecting system according to claim 1, further comprising a radio wave generating device (23) attached to the vehicle (17) and configured to generate the radio wave.

5. The extravisual obstacle detecting system according to claim 1, wherein the radio wave is a radio wave having a frequency of a microwave band or less.

6. The extravisual obstacle detecting system according to claim 1, wherein the one or the plurality of external sensors (19) is configured to use a second radio wave having a frequency which is five times or more as a frequency of the radio wave from the radio wave source (13).

7. The extravisual obstacle detecting system according to claim 1, wherein the one or the plurality of external sensors (19) photographs a field of view only in front of the vehicle (17).

8. The extravisual obstacle detecting system according to claim 1, further comprising a viewing direction selecting device (25) attached to the vehicle (17) and configured to select a viewing direction of a driver,
    wherein the one or the plurality of external sensors (19) photographs the field of view only in the viewing direction of the driver.

9. The extravisual obstacle detecting system according to claim 4, wherein the alarm generating unit (21) is configured to obtain a difference between a frequency of the radio wave received by the radio wave receiving unit (15) and a frequency of the radio wave generated by the radio wave generating device (23), and does not generate the first alarm when the obtained frequency difference is a predetermined value or less.

10. The extravisual obstacle detecting system according to claim 1, wherein the one or the plurality of external sensors (19) detects an external obstacle only in front of the vehicle (17).

* * * * *